US008442491B2

(12) United States Patent
Bae (10) Patent No.: US 8,442,491 B2
(45) Date of Patent: May 14, 2013

(54) METHOD AND SYSTEM FOR PROVIDING ROAMING SERVICE IN WIRELESS COMMUNICATION SYSTEM

(75) Inventor: Su-Jin Bae, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 155 days.

(21) Appl. No.: 12/927,516

(22) Filed: Nov. 17, 2010

(65) Prior Publication Data

US 2011/0117910 A1    May 19, 2011

(30) Foreign Application Priority Data

Nov. 17, 2009   (KR) .................. 10-2009-0110685

(51) Int. Cl.
*H04W 4/00* (2009.01)

(52) U.S. Cl.
USPC ........ 455/411; 455/433; 455/432.1; 455/445; 455/435.1; 370/352; 370/329; 370/310; 370/331

(58) Field of Classification Search ............... 455/411, 455/433, 432.1, 445, 435.1; 370/352, 329, 370/310, 331
See application file for complete search history.

(56) References Cited

U.S. PATENT DOCUMENTS

| 7,062,265 | B1* | 6/2006 | Chang et al. ............... 455/426.1 |
| 7,502,339 | B1* | 3/2009 | Pirkola et al. ................. 370/310 |
| 7,539,309 | B2* | 5/2009 | Stadelmann et al. ......... 380/270 |
| 2003/0027569 | A1* | 2/2003 | Ejzak ............................ 455/432 |
| 2005/0177733 | A1* | 8/2005 | Stadelmann et al. ......... 713/185 |
| 2008/0020776 | A1* | 1/2008 | Deshpande et al. .......... 455/445 |
| 2008/0039104 | A1* | 2/2008 | Gu et al. ....................... 455/445 |
| 2008/0247385 | A1* | 10/2008 | Witzel et al. .................. 370/352 |
| 2009/0052385 | A1* | 2/2009 | Sylvain et al. ................ 370/329 |
| 2009/0181671 | A1* | 7/2009 | Preiss et al. ................ 455/435.1 |
| 2009/0323636 | A1* | 12/2009 | Dillon et al. .................. 370/331 |
| 2010/0135282 | A1* | 6/2010 | Feng et al. .................... 370/352 |
| 2010/0189072 | A1* | 7/2010 | Vikberg et al. ............... 370/331 |

* cited by examiner

*Primary Examiner* — Meless N Zewdu
*Assistant Examiner* — Jean Chang (57) ABSTRACT

A method and apparatus for providing roaming service in a wireless communication system. A roaming gateway for performing communication between an Internet protocol multimedia subsystem (IMS) network and a circuit switched (CS) network receives an authentication request for a roaming mobile station (MS), which roams from an IMS network to a CS network, from a mobile service center (MSC) of the CS network, acquires authentication information for the roaming MS and service information for services, with which the roaming MS has been provided from the IMS network, at the authentication request, checks if the roaming MS is entitled to use the services according to the service information by using the authentication information and the service information, and sends an authentication success message to the MSC when the roaming MS is entitled to use the services.

20 Claims, 7 Drawing Sheets

METHOD AND SYSTEM FOR PROVIDING ROAMING SERVICE IN WIRELESS COMMUNICATION SYSTEM

CROSS-REFERENCE TO RELATED APPLICATION(S) AND CLAIM OF PRIORITY

The present application is related to and claims priority to an application entitled "Method and System for Providing Roaming Service in Wireless Communication System" filed in the Korean Industrial Property Office on Nov. 17, 2009, and assigned Serial No. 10-2009-0110685, the contents of which are hereby incorporated by reference.

TECHNICAL FIELD OF THE INVENTION

The present invention relates to a method and system for providing roaming service in a wireless communication system.

BACKGROUND OF THE INVENTION

Roaming refers to service that enables a mobile station to continuously use communication service without interruption in service or loss in connectivity when the mobile station moves from the service network of a communication operator, with which it is registered, to the service network of another communication operator.

Roaming service provided in conventional communication networks includes roaming service between 2G CDMA (Code Division Multiple Access) operators, roaming service between GSM (Global System for Mobile Communications) operators, roaming service between 3G WCDMA (Wideband Code Division Multiple Access) operators, roaming service between a GSM operator and a WCDMA operator, and so forth.

When a mobile station roams between circuit switched (CS) networks, such as a 2G CDMA network, a GSM network, and a WCDMA network, there is an interface that makes it possible to provide supplementary services, serviced by a home network, to the corresponding mobile station in a roaming network. Accordingly, a mobile station using roaming service between CS networks can be provided with supplementary services, such as calling line identification presentation/restriction service and call holding/call waiting service, as well as voice service.

In recent years, communication operators have revealed a desire to simultaneously provide VoIP service, serviced by an Internet protocol multimedia subsystem (IMS) network, and voice service, serviced by a CS network, to one dual mode mobile station.

To this end, when a mobile station roams between an IMS network and a CS network, a function is needed to provide not only the voice service, but also supplementary services, serviced by a home network, that is, the IMS network, to the mobile station in the CS network to which the mobile station roams.

Up to now, however, there is no network architecture or interface for providing supplementary services to a mobile station when the mobile station roams between an IMS network and a CS network. Accordingly, there is a problem in that a mobile station roaming from an IMS network to a CS network cannot be provided with or control supplementary services, serviced by the IMS network, in the CS network.

SUMMARY OF THE INVENTION

To address the above-discussed deficiencies of the prior art, it is a primary object to provide a method and system for providing roaming service in a wireless communication system.

Further, the present invention provides a method and system for providing services, serviced by an IMS network, to a mobile station in a CS network when the mobile station roams from the IMS network to the CS network in a wireless communication system.

Further, the present invention provides a method and system for allowing a mobile station to control services, provided from an IMS network, in a CS network when the mobile station roams from the IMS network to the CS network in a wireless communication system.

Further, the present invention provides a method and system for providing various supplementary services by extending a roaming agreement between an IMS network operator and a CS network operator in a wireless communication system.

In accordance with an aspect of the present invention, there is provided a method of providing roaming service in a wireless communication system. The method includes receiving an authentication request for a roaming mobile station (MS), which roams from an Internet protocol multimedia subsystem (IMS) network to a circuit switched (CS) network, from a mobile service center (MSC) of the CS network by a roaming gateway (RGW) performing communication between the IMS network and the CS network. The method also includes acquiring authentication information for the roaming MS and service information for services, with which the roaming MS has been provided from the IMS network, at the authentication request. The method also includes checking if the roaming MS is entitled to use the services according to the service information, using the authentication information and the service information. The method further includes, if the roaming MS is entitled to use the services, sending an authentication success message to the MSC. The method still further includes sending the service information to the MSC so as for the roaming MS to be provided with the services according to the service information in the CS network.

In accordance with another aspect of the present invention, there is provided a system for providing roaming service in a wireless communication system. The system includes a roaming mobile station (MS) roaming from an Internet protocol multimedia subsystem (IMS) network to a circuit switched (CS) network. The system also includes a mobile service center (MSC) for managing and controlling the CS network. The system further includes a roaming gateway (RGW) for performing communication between the IMS network and the CS network, receiving an authentication request for the roaming MS from the MSC, acquiring authentication information for the roaming MS and service information for services, with which the roaming MS has been provided from the IMS network, at the authentication request, checking if the roaming MS is entitled to use the services according to the service information, using the authentication information and the service information, if the roaming MS is entitled to use the services, sending an authentication success message to the MSC, and sending the service information to the MSC so as for the roaming MS to be provided with the services according to the service information in the CS network.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication network. Also, in the following description, a detailed description of known functions and configurations incorporated herein will be omitted when it may obscure the subject matter of the present invention. Further, it should be noted that only parts essential for understanding the operations according to the present invention will be described and a description of parts other than the essential parts will be omitted in order not to obscure the gist of the present invention.

The present invention proposes a method and system for providing roaming service in a wireless communication system. More particularly, the present invention proposes a method and system for providing roaming service between an Internet protocol (IP) multimedia subsystem (IMS) network based on an IP access network and a circuit switched (CS) network. Examples of the IMS network include Mobile WiMAX, WCDMA (Wideband Code Division Multiple Access), HSDPA (High Speed Downlink Packet Access), CDMA (Code Division Multiple Access), EvDO (Evolution-Data Optimized), and the like. Examples of the CS network include a 2G/3G network, a GSM (Global System for Mobile Communications) network, a WCDMA network, and the like.

According to embodiments of the present invention, when a mobile station (MS), a subscriber of an IMS network, roams from an IMS network to a CS network, services that have been provided to the MS in a home network (i.e. the IMS network), such as call forwarding service and call barring service, can also be provided to or controlled by the MS.

Hereinafter, a wireless communication system according to an embodiment of the present invention will be described with reference to FIG. 1. It should be noted that the term "mobile station (MS)" will be used together with the term "subscriber" in the following description.

Figure 1:
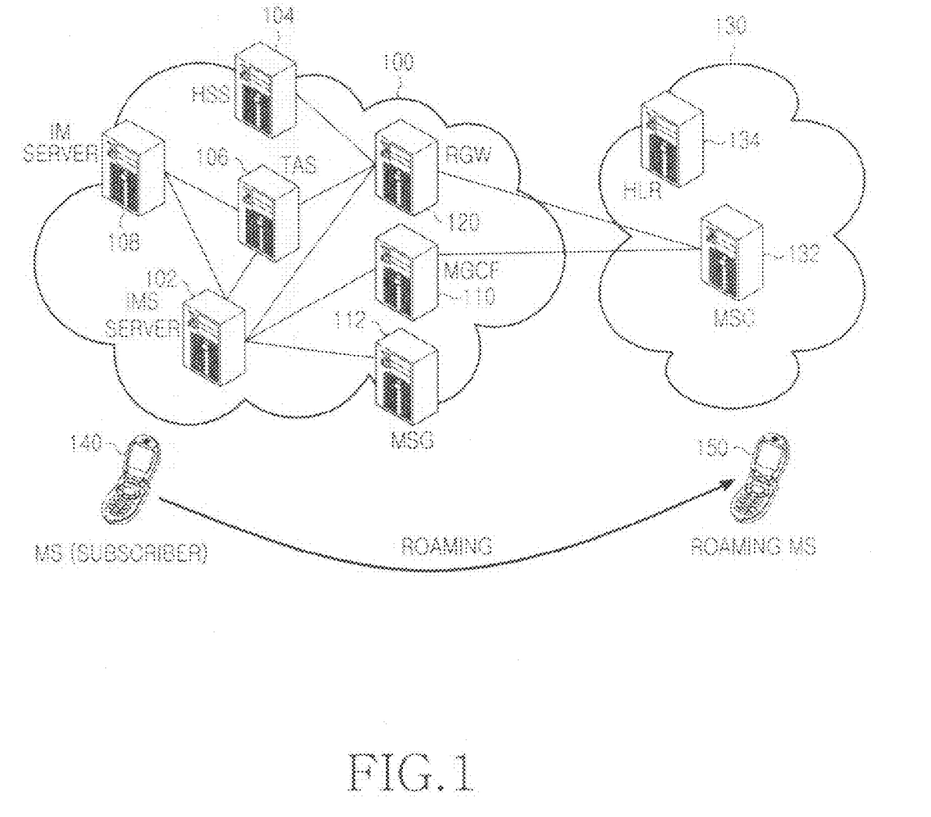
FIG. 1 illustrates a wireless communication system in accordance with an embodiment of the present invention.

FIG. 1 illustrates a wireless communication system according to an embodiment of the present invention.

Referring to FIG. 1, the wireless communication system includes an IMS network 100 and a CS network 130. Also, an MS 140 that is a subscriber of the IMS network 100 may roam from the IMS network (home network) to the CS network (roaming network). The MS 140 supports both the packet access network service mode of the IMS network 100 and the voice service mode of the CS network 130. That is, the MS 140 can use supplementary services, such as VoIP (Voice over Internet Protocol), as well as the voice service.

The IMS network 100 includes an IMS server 102 for controlling sessions of subscribers, a home subscriber server (HSS) 104 for storing profiles of the subscribers, a telephony application server (TAS) 106 for providing supplementary services, an instant messaging (IM) server 108 for providing message services, a media gateway control function (MGCF) 110 for enabling voice service between the IMS network 100 and the CS network 130, and a messaging gateway (MSG) 112 for enabling message services between the IMS network 100 and the CS network 130.

More specially, the IMS server 102 performs call and service processing for the MS 140 when the MS 140 is located in the IMS network 100. The HSS 104 provides the IMS server 102 with the profile of the MS 140 so as for the IMS server 102 to perform call and service processing, and the IMS server 102 interworks with the TAS 106, the IM server 108, a roaming gateway (RGW) 120, the MSG 112, and the like in order to provide services to the MS 140. The IMS server 102 also performs the call session control function (CSCF) and the breakout gateway control function (BGCF).

The MGCF 110 is a gateway that enables voice signal transmission/reception between the IMS network 100 and the CS network 130. That is, the MGCF 110 serves as a path for voice signals transmitted/received between the IMS network 100 and the CS network 130.

The HSS 104 stores and manages profiles of subscribers within the IMS network 100. The HSS 104 divides subscribers into roaming subscribers and non-roaming subscribers, and manages subscriber profiles according to the roaming and non-roaming subscribers. Also, in managing the service profile of a roaming subscriber, the HSS 104 separates a roaming state from a non-roaming state.

When a roaming subscriber roams to another network, the HSS 104 delivers roaming information for the roaming subscriber to the IMS server 102 so as for the IMS server 102 to perform roaming service according to the roaming of the MS 140. The roaming information may include service profile information for the roaming subscriber in a roaming state.

When the RGW 120 requests the HSS 104 for authentication information for a roaming subscriber, the HSS 104 provides the RGW 120 with profile information for the corresponding roaming subscriber. The HSS 104 also stores the address of an application server for providing services according to subscribers, for example, the address of the TAS 106, and provides the IMS server 102 with the stored address.

In addition, the HSS 104 provides the IMS server 102 with service triggering information so as for the IMS server 102 to provide services divided according to whether or not a roaming subscriber is in a roaming state.

Figure 2:
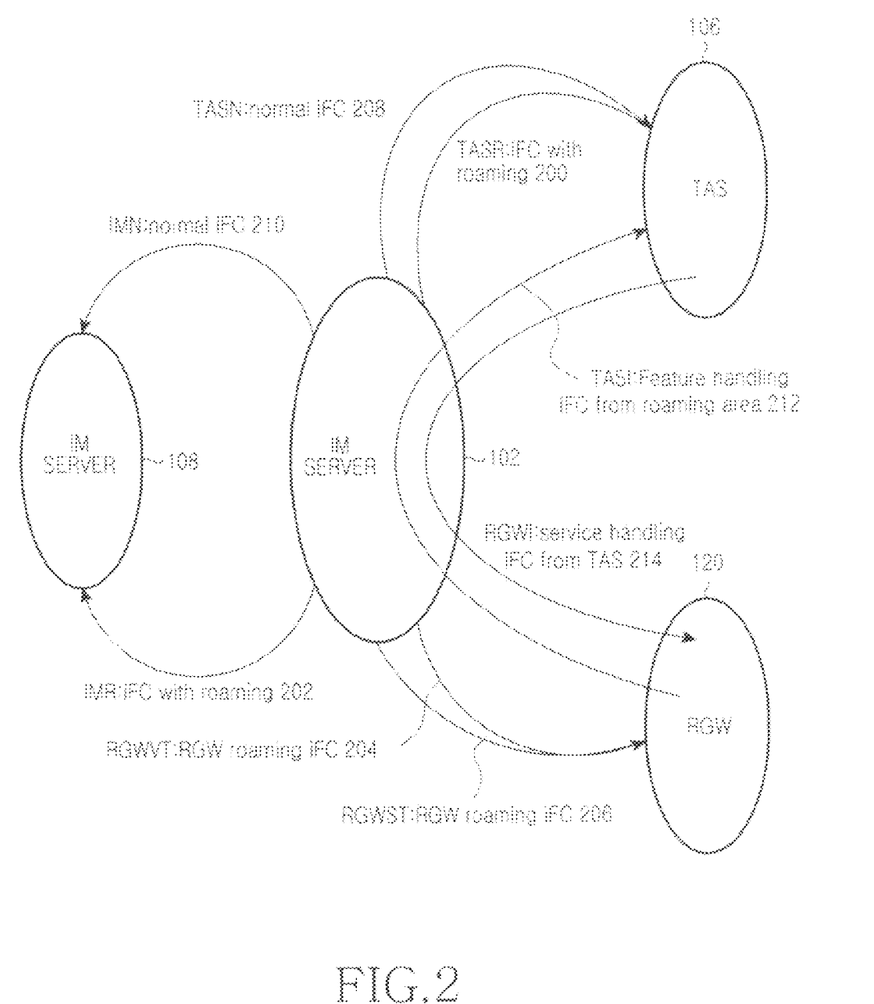
FIG. 2 illustrates service triggering information that an HSS provides to an IMS server in accordance with an embodiment of the present invention.

When a roaming subscriber is in a roaming state, the HSS 104 activates TASR 200, IMR 202, RGWVT 204, and RGWST 206 among multiple pieces of triggering information as shown in FIG. 2. Here, "R" denotes "roaming", "VT" denotes "voice service", and "ST" denotes "short messaging service (SMS)". The HSS 104 also provides the IMS server 102 with the activated triggering information.

The TASR 200, as initial filter criteria (iFC) with roaming, is triggering information that is used for the IMS server 102 to trigger a received incoming call to the TAS 106 in order to perform service processing for the received incoming call when the received incoming call is a roaming incoming call destined to the roaming subscriber. The IMR 202, as iFC with roaming, is triggering information that is used for the IMS server 102 to trigger a received message to the IM server 108 in order to perform service processing for the received message when the received message is a roaming message destined to the roaming subscriber. The RGWVT 204, as iFC with roaming, is triggering information that is used for the IMS server 102 to trigger a request for processing the roaming incoming call to the RGW 120 in order to deliver the roaming incoming call to the roaming subscriber. The RGWST 206, as iFC with roaming, is triggering information that is used for the IMS server 102 to trigger a request for processing the roaming message to the RGW 120 in order to deliver the roaming message to the roaming subscriber.

When the roaming subscriber is not in a roaming state, the HSS 104 activates TASN 208 and IMN 210 among the multiple pieces of triggering information as shown in FIG. 2. The HSS 104 also provides the IMS server 102 with the activated triggering information.

The TASN 208 is used for the IMS server 102 to trigger a received call to the TAS 106 in order to perform service processing for the received call when the received call is a call destined to a subscriber located in the IMS network 100. The IMN 210 is used for the IMS server 102 to trigger a received message to the IM server 108 in order to perform service processing for the received message when the received message is a message destined to a subscriber located in the IMS network 100.

Further, the HSS 104 provides the IMS server 102 with TASI 212 and RGWI 214 for service control in the IMS network 100 and the CS network 130, which are in an activation state. Here, "I" denotes "interworking".

The TASI 212 is used for the RGW 120 to trigger a request relevant to service information for the roaming subscriber to the TAS 106 in order to request the TAS 106 to provide or change the service information for the roaming subscriber. The RGWI 214 is used for the TAS 106 to trigger information relevant to the service information for the roaming subscriber to the RGW 120 in order to provide the service information or a result of service change processing. In this way, the HSS 104 manages the above-mentioned triggering information such that appropriate services are provided according to whether or not a roaming subscriber is in a roaming state.

The TAS 106 provides a variety of services to subscribers of the IMS network 100, and stores and manages service information according to the subscribers. The services provided by the TAS 106 may include supplementary services used in the conventional CS network 130, for example, call forwarding, call barring, calling line identification presentation/restriction, and call holding/call waiting.

The TAS 106 not only provides the MS 140 with various services, but also manages information for use in providing the various services to the CS network 130 when the MS 140 roams to the CS network 130. The TAS 106 also controls service provision to the CS network according to whether or not the MS 140 is in a roaming state. The TAS 106 checks if the MS 140 is in a roaming state, and provides the RGW 120 with service information for the MS 140. This is intended to send the service information for the MS 140 to the CS network 130.

According to the service operating policy of the operator of the IMS network 100, the services provided by the TAS 106 may be provided from the IMS server 102. In other words, it is possible to integrate the IMS server 102 and the TAS 106 into one constituent unit.

The IM server 108 provides the MS 140 with message-based services, for example, short message service, large message service, and multimedia message service. The IM server 108 also controls message services according to whether or not the MS 140 roams to a roaming network. When the MS 140 roams to a roaming network, the IM server 108 manages information for use in providing message services to the roaming network.

The MSG 112 serves as a path for messages transmitted/received between the IMS network 100 and the CS network 130, and enables message services to be provided between the IMS network 100 and the CS network 130. As an example, when there is a message to be transmitted from the IMS network 100 to the CS network 130, the MSG 112 enables the message to be transmitted to an MSC 132 of the CS network 130 via the RGW 120.

Next, constituent units of the CS network 130 will be discussed. The CS network 130 includes a mobile service center (MSC) 132 responsible for call processing and subscriber processing and a home location register (HLR) 134 for storing subscriber profiles of the CS network 130.

The MSC 132 downloads a subscriber profile from the HLR 134, and performs call processing for a corresponding subscriber. When the MS 140 roams from the IMS network 100 to the CS network 130, the MSC 132 performs call processing for the MS 150 and processing for service interworking with the IMS network 100 such that the roaming MS 150 is provided with services, serviced by the IMS network 100, in the CS network 130.

The MSC 132 stores the address of the RGW 120 as an HLR address for registration and authentication processing of roaming MSs pursuant to the roaming agreement with the IMS network 100. This is because the RGW 120 operates as an HLR for providing information on the roaming MSs on behalf of the CS network 130.

The MSC 132 can receive service information, which is provided by the IMS network 100, from the RGW 120. Accordingly, the MSC 132 can provide the roaming MSs with services according to the received service information.

The HLR 134 stores subscriber profiles of the CS network 130, and also stores types of services provided according to subscribers within the CS network 130. Further, the HLR 134 stores interworking information for services provided by the IMS network 100, and provides the stored interworking information to the MSC 132.

The RGW 120 performs conversion of a protocol for communication between the IMS network 100 and the CS network 130 or interworking processing for signals transmitted/received between the IMS network 100 and the CS network 130 in order to provide a roaming function between the IMS network 100 and the CS network 130. As an example, the RGW 120 converts a protocol in use into 3G MAP (Mobile Application Part) when the CS network 130 is a 3G network, converts a protocol in use into IS-41 (Interim Standard-41) MAP when the CS network is a CDMA network, and converts a protocol in use into GSM MAP when the CS network 130 is a GSM network.

The RGW 120 serves as an HLR with respect to the MSC 132 of the CS network 130, and serves as an application server with respect to the HSS 104 of the IMS network 100. The RGW 120 receives service information from the TAS 106, which is the service provision system of the IMS network 100, such that the roaming MS 150, which is a subscriber of the IMS network 100, can also be provided with services, serviced by the IMS network 100, in the roaming network, that is, the CS network 130.

The RGW 120 acquires service information for the roaming MS 150, and delivers the acquired service information to the MSC 132 of the CS network 130. Further, the RGW 120 sends a request for service information control by the roaming MS 150 (e.g. request for service activation, deactivation, deletion, change, and so forth), which is transmitted from the CS network 130, to the IMS network 100, thereby providing a function of allowing the roaming MS 150 to control services, serviced by the IMS network 100, in the CS network 130.

While the RGW 120 in FIG. 1 is illustrated as being included in the IMS network 100, it will be apparent to those skilled in the art that the RGW 120 may also be included in the CS network 130.

When the MS 140 roams from the IMS network 100 to the CS network 130 in the so-configured wireless communication system, the MS 140 can be conveniently provided with VoIP service in the IMS network 100 while being provided with circuit-based voice service in the roaming network, that is, the CS network 130.

Hereinafter, a roaming method between the IMS network 100 and the CS network 130 in the wireless communication system shown in FIG. 1 will be described in detail.

Figure 3:
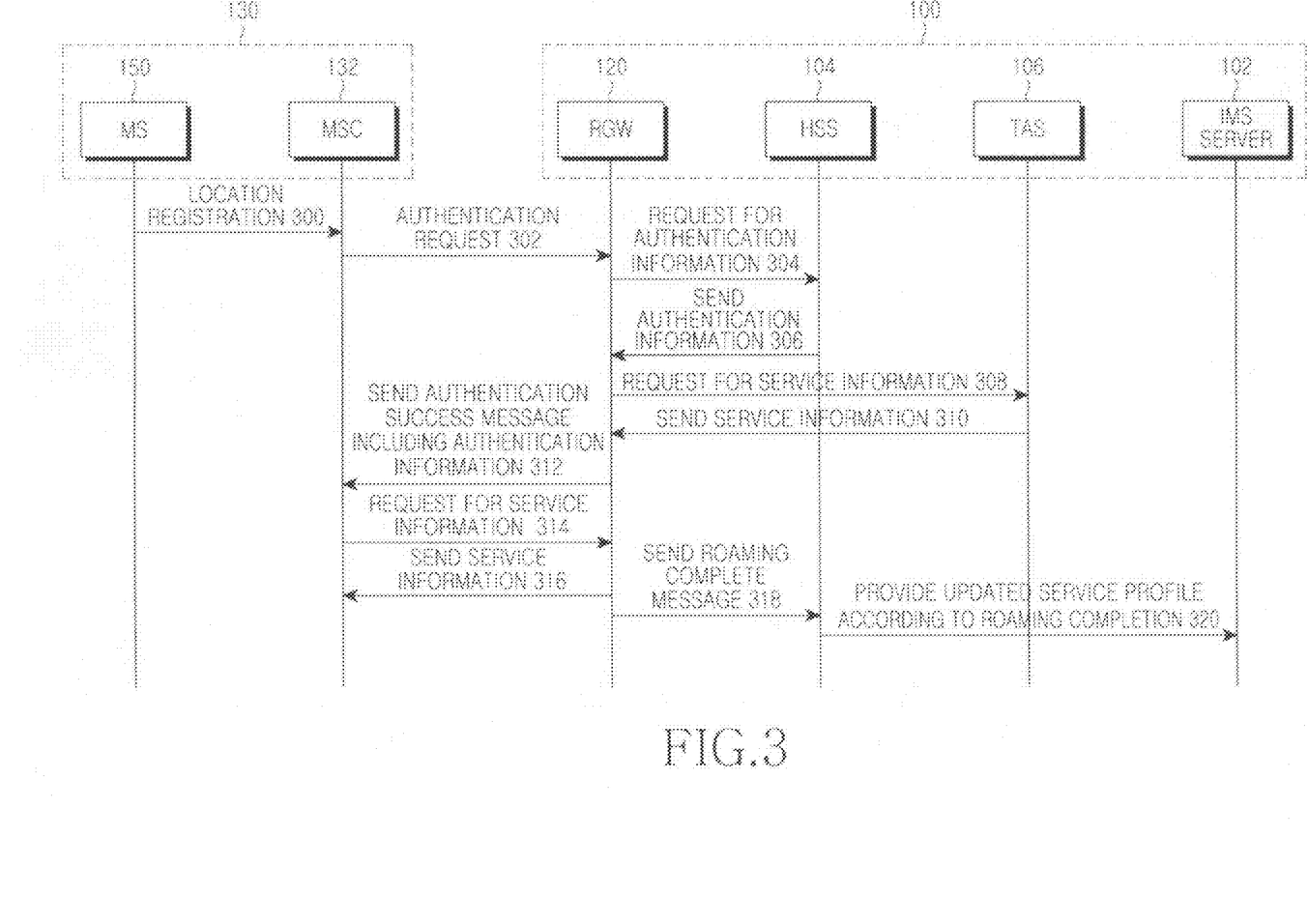
FIG. 3 illustrates a procedure in which an MS roaming from an IMS network to a CS network in a wireless communication system acquires service information of the IMS network in the CS network in accordance with an embodiment of the present invention.

Reference will first be made to FIG. 3 illustrating a procedure in which the MS (roaming MS) 150 roaming from the IMS network 100 to the CS network 130 in the wireless communication system acquires supplementary service information of the IMS network 100 in the CS network 120 according to an embodiment of the present invention.

Referring to FIG. 3, when the MS 150, a subscriber of the IMS network 100, roams from the IMS network 100 to the CS network 130, the MS 150 performs location registration with the MSC 132 in block 300. If the location of the MS 150 is registered with the MSC 132, then the MSC 132 determines that the MS 150 is in the CS network 130. In block 302, the MSC 132 sends an authentication request for the MS 150 to the RGW 120 in order to authenticate the MS 150 for registration and management thereof.

With regard to this, the MSC 132 sends the authentication request to the RGW 120 by using the identifier of the MS 150, such as international mobile station identity (IMSI). The RGW 120 serves as an HLR for the MS 132. That is, the RGW 120 operates as an HLR for MSs roaming to the CS network 130, which provides profile information and the like for the roaming MSs.

The RGW 120 receives the authentication request for the MS 150 from the CS network 130, and sends a request for authentication information for the MS 150 to the HSS 104 of the IMS network 100 in block 304. The RGW 120 maps service information between the IMS network 100 and the CS network 130, and performs interface change processing for data or message transmission/reception between the IMS network 100 and the CS network 130.

Upon receiving the request for authentication information, the HSS 104 confirms from the pre-stored subscriber profile of the MS 150 that the MS 150 is a subscriber entitled to roam the wireless communication system, and then sends authentication information for the MS 150 to the RGW 120 in block 306. The authentication information may include an authentication key corresponding to the MS 150.

Upon receiving the authentication information, in block 308, the RGW 120 sends a request for service information for the MS 150 to the TAS 106, which is the service provision system of the IMS network 100, in order to receive service information for the MS 150. Here, the request for service information, sent by the RGW 120, is first sent to the IMS server 102. The IMS server 120 then delivers the request for service information to the TAS 106 by using the service triggering information TASI. Of course, the request for service information, sent by the RGW 120, may be sent directly to the TAS 106, as shown in FIG. 3.

The service information for the MS 150 may include service list information, information on whether or not barring service is registered, barring rule information, message-related rule information, and the like. Upon receiving the request for service information, the TAS 106 detects service information corresponding to the MS 150 from pre-stored service information according to subscribers. In block 310, the TAS 106 sends the detected service information to the RGW 120. Here, the service information sent by the TAS 106 is first sent to the IMS server 102. The IMS server 102 then delivers the service information to RGW 120 by using the service triggering information RGWI. Of course, the service information sent by the TAS 106 may be sent directly to the RGW 120, as shown in FIG. 3.

The service information sent by the TAS 106 may be defined, for example, in the form of XML (Extensible Markup Language) within an SIP (Session Initiation Protocol) message, as shown below in Table 1.

TABLE 1

```
OPTIONS sip:7780001@solution.com SIP/2.0
  From: sip:7780001@solution.com;tag=1928301774
  To: sip:7780001@solution.com
  Accept: application/rgwServinfo+ xml
  Content-Length: 0
SIP/2.0 200 OK
  To: sip:7780001@solution.com;tag=93810874
  From: sip:7780001@solution.com;tag=1928301774
  Content-Type: application/rgwServinfo+ xml
  Content-Length: 274
  <?xml version="1.0" encoding="UTF-8"?>
  <tas-services xmlns="urn:ss:params:xml:ns:tas-services">
    <tas-service tas-action="serviceinfo">
      <cfu>
        <cfu-data tdn="0707001001"/>   ==>   Call Forwarding Unconditional
                                             service
                                             activation state and CFU number
      </cfu>                                 delivery
      <cfcon/>                         ==>   Call Forwarding Conditional
                                             service activation state
      <cru>                            ==>   International Outgoing Call
        <cru-data dialLimit="international"/> Restriction Unconditional
                                             service activation
      </cru>
    </tas-service>
</tas-services>
```

By way of example, Table 1 shows that call forwarding unconditional (CFU) service, call forwarding conditional (CFC) service, and international outgoing call restriction unconditional (CRU) service are in an activation state. Thus, when the RGW 120 receives a message as shown in Table 1 from TAS 106, it can know that the MS 150 uses CFU service for a specific CFU number, CFC service, and international outgoing CRU service.

The RGW 120 stores the service information received from the TAS 106. Further, as the RGW acquires both the authentication information and the service information, it determines that the MS 150 is an authenticated subscriber entitled to use services of the IMS network 100. Accordingly, in order to inform the MSC 132 that the MS 150 is successfully authenticated, the RGW 120 sends an authentication success message including the authentication information to the MSC 106 in block 312.

Upon receiving the authentication success message, the MSC 132 determines that the MS 150 is an authenticated MS. In block 314, the MSC 106 requests the RGW 120 for service information in order to acquire service information for the MS 150. In block 316, the RGW 120 sends the stored service information for the MS 150 to the MSC 132. As a result, the MSC can subsequently receive services corresponding to the service information through the RGW 120, and provide the services to the MS 150.

When transmission of both the authentication information and service information for the MS 150 is completed, in block 318, the RGW 120 sends a roaming complete message, which indicates that the MS 150 has roamed to the CS network 130, to the HSS 104.

As the MS 150 has roamed to the CS network 130, the HSS 104 updates service profile information for the MS 150, and provides the service profile information, updated according to the completion of roaming, to the IMS server 102 in block 320.

Through the above procedure, the MS 150 can conveniently continue to use services, serviced by the IMS network 100, even when roaming to the CS network 130.

Figure 4:
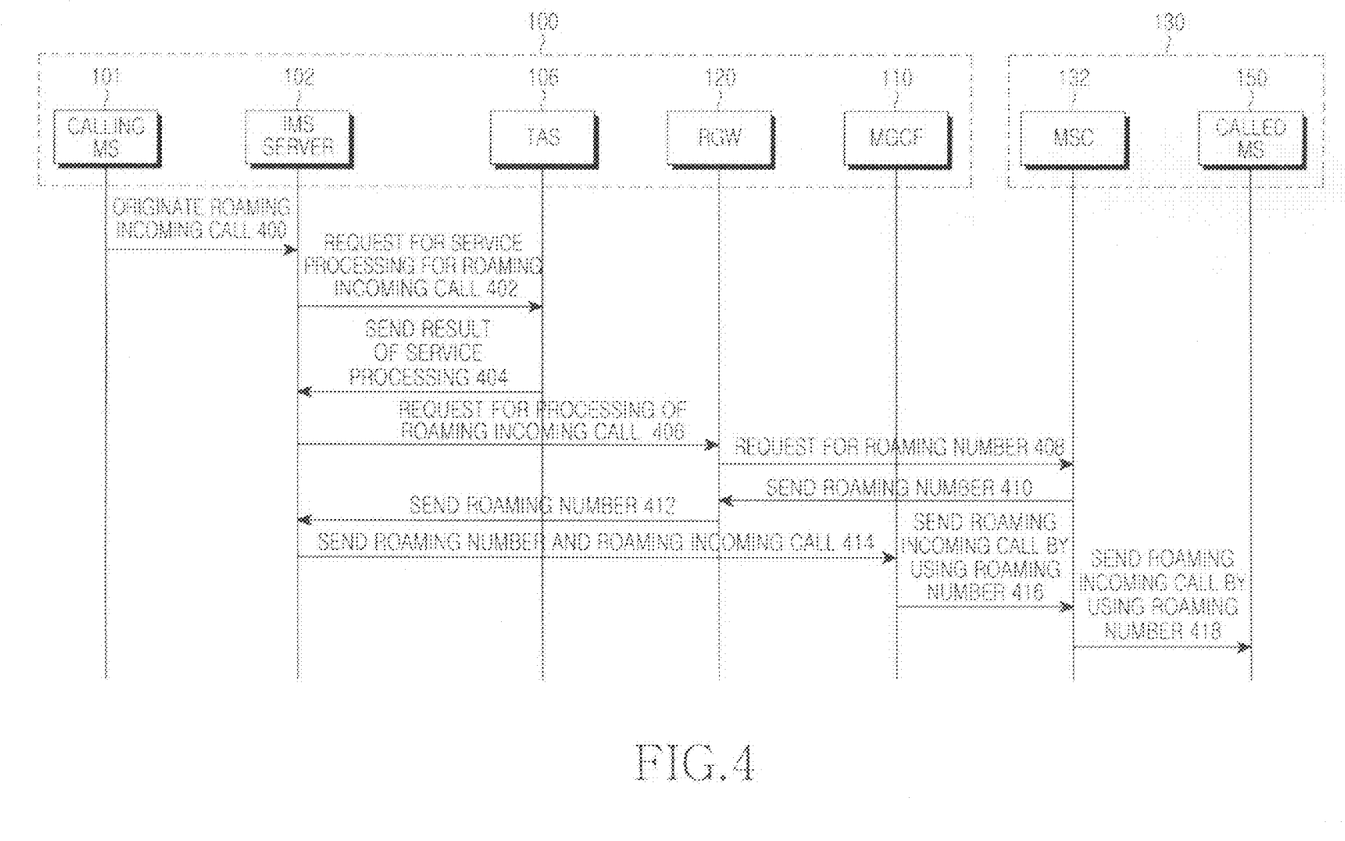
FIG. 4 illustrates a procedure in which a call is terminated to a called MS roaming from an IMS network to a CS network in a wireless communication system when an MS in the IMS network originates the call to the called MS in accordance with an embodiment of the present invention.

Next, reference will be made to FIG. 4 illustrating a procedure in which a call is terminated to the MS (called MS) 150 roaming from the IMS network 100 to the CS network 130 in the wireless communication system when an MS (calling MS) 101 in the IMS network 100 originates the call to the called MS 150 according to an embodiment of the present invention.

Referring to FIG. 4, in block 400, the calling MS 101, which is an MS in the IMS network 100, originates a call destined to the called MS 150, which is an MS roaming from the IMS network 100 to the CS network 130. For the convenience of explanation, the call originated from the calling MS 101 to the called MS 150 will be referred to as the "roaming incoming call".

The roaming incoming call is first terminated to the IMS server 102. The calling MS 101 acquires the address of the IMS server 102 by using an HSS query, and then can deliver the roaming incoming call to the IMS server 102 by using the acquired address.

Since the IMS server 102 has received the service profile information for the MS, updated according to the completion of roaming, from the HSS 104, as described in block 320 of FIG. 3, it can acquire termination service information for the called MS 150 in a roaming state. The IMS server 102 also has service triggering information provided in advance from the HSS 104.

Thereupon, in block 402, the IMS server 102 requests the TAS 106 for service processing for the call that is originated to the called MS 150 during roaming, that is, the roaming incoming call, by using the TASR among the service triggering information. Here, the IMS server 102 may deliver the roaming incoming call to the TAS 106 while requesting the TAS 106 for service processing for the roaming incoming call.

In block 404, the TAS 106 performs the service processing at the service processing request, and then sends the result of the service processing to the IMS server 102. For example, when the called MS 150 uses incoming call barring service during roaming, the TAS 106 cancels the roaming incoming call, and sends the result of such processing to the IMS server 102. Conversely, when the called MS 150 uses no supplementary services during roaming, the TAS 106 sends the roaming incoming call to the IMS server 102 again.

In order to acquire roaming information, the IMS server 102 uses the service triggering information RGWVT to perform service triggering to the RGW 120. That is, in block 406, the IMS server 102 sends a processing request for the roaming incoming call to the RGW 120.

Since the RGW 120 can acquire profile information and service information for the called MS 150 located in the CS network 130 from the HSS 104 and the TAS 106 respectively, it can know that the called MS 150 has roamed to the CS network 130. Thus, in order to acquire the roaming number of the called MS 150, the RGW 120 requests the MSC 132 for the roaming number of the called MS 150 in block 408.

In block 410, the MSC 132 then sends the roaming number of the called MS 150 to the RGW 120 at the request in block 408. Upon receiving the roaming number, in block 412, the RGW 120 sends the roaming number to the IMS server 102. This is intended to request the IMS server 102 for a call termination attempt by use of the roaming number.

In block 414, in order to allow the roaming incoming call to be transmitted to the CS network 130, the IMS server 102 sends the roaming number and the roaming incoming call to the MGCF 110 for routing a voice signal of the IMS network 100 to the CS network 130. In block 416, the MGCF 110 then transmits the roaming incoming call to the MSC 132 of the CS network 130 by using the roaming number. In block 418, the MSC transmits the roaming incoming call to the called MS 150 by using the received roaming number.

Accordingly, the called MS 150 can conveniently perform voice communication with the user of the calling MS 101 in the IMS network 100, even when located in the CS network 130.

Figure 5:
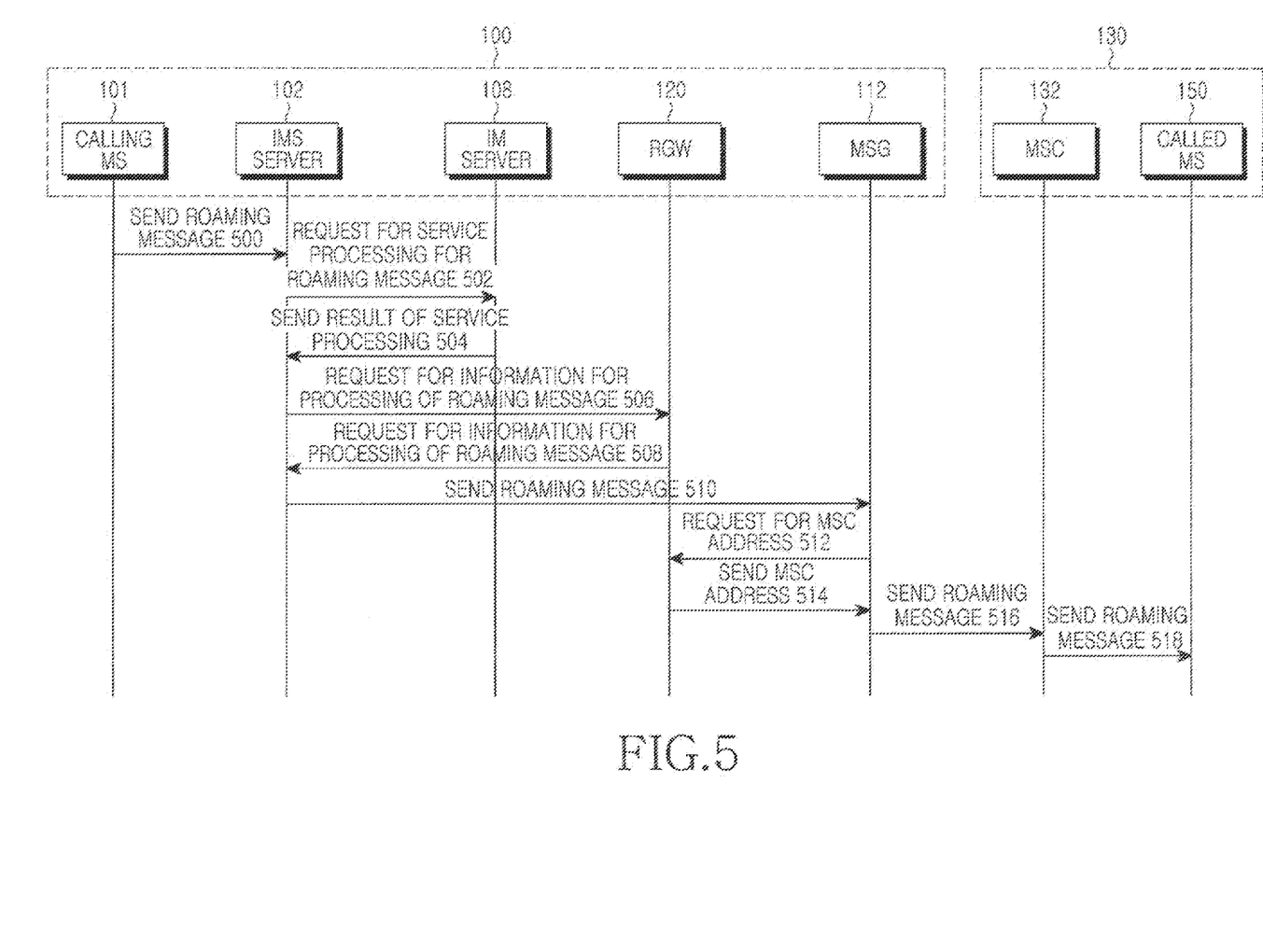
FIG. 5 illustrates a procedure in which a called MS roaming from an IMS network to a CS network in a wireless communication system receives a message in the CS network when an MS in the IMS network sends the message to the called MS in accordance with an embodiment of the present invention.

Next, reference will be made to FIG. 5 illustrating a procedure in which the MS (called MS 150), roaming from the IMS network 100 to the CS network 130 in the wireless communication system, receives a message in the CS network 130 when an MS (calling MS 101) in the IMS network 100 sends the message to the called MS 150 according to an embodiment of the present invention.

Referring to FIG. 5, in block 500, the calling MS 101, which is an MS in the IMS network 100, sends a message destined to the called MS 150, which is an MS roaming from the IMS network 100 to the CS network 130. For the convenience of explanation, the message sent from the calling MS 101 to the called MS 150 will be referred to as the "roaming message".

The roaming message is first sent to the IMS server 102. The calling MS 101 acquires the address of the IMS server 102 by using an HSS query, and then can send the roaming message to the IMS server 102 by using the acquired address.

The IMS server 102 can acquire and know service information for roaming message reception of the called MS 150 from the HSS 104. The IMS server 102 also has service triggering information provided in advance from the HSS 104.

Thereupon, the IMS server 102 performs triggering to request the IM server 108 for service processing for roaming message reception, by using the IMR among the service triggering information. That is, in block 502, the IMS server 102 requests the IM server 108 for service processing for the roaming message sent to the called MS 150. Here, the IMS server 102 may deliver the roaming message to the IM server 108 while requesting the IM server 108 for service processing for the roaming message.

In block 504, the IM server 108 performs the service processing at the service processing request, and then sends the result of the service processing to the IMS server 102. For example, when the called MS 150 uses incoming message barring service during roaming, the IM server 108 cancels the roaming message, and sends the result of such processing to the IMS server 102. Conversely, when the called MS 150 uses no supplementary services during roaming, the IM server 108 sends the roaming message to the IMS server 102 again.

In order to acquire roaming information, the IMS server 102 uses the service triggering information RGWST to perform service triggering to the RGW 120. That is, in block 506, the IMS server 102 requests the RGW 120 for roaming message processing information.

The RGW 120 recognizes that the received message corresponds to message transmission to the called MS 150 that is a roaming subscriber, and sets roaming message processing information. The roaming message processing information may include the address information of the MSG 112 for routing a roaming message of the IMS network 100 to the CS network 130.

In block 508, the RGW 120 sends the roaming message processing information to the IMS server 102. In block 510, the IMS server 102 then sends the roaming message to the MSG 112 by using the address information of the MSG 112, included in the roaming message processing information.

In block 512, in order to send the roaming message to the CS network 130, the MSG 112 requests the RGW 120 for the address of the MSC 132 of the CS network 130. The address of the MSC 132 of the CS network 130 is previously stored in the RGW 120 pursuant to the roaming agreement between the IMS network operator and the CS network operator. Thus, in block 514, the RGW 120 sends the stored address of the MSC 132 to the MSG 112.

Upon receiving the address of the MSC 132, in block 516, the MSG 112 sends the roaming message to the MSC 132 by using the received address of the MSC 132. In block 518, the MSC 132 then sends the roaming message to the called MS 150.

Accordingly, the user of the called MS 150 can conveniently exchange a message with the user of the calling MS 101 in the IMS network 100, even when located in the CS network 130.

Figure 6:
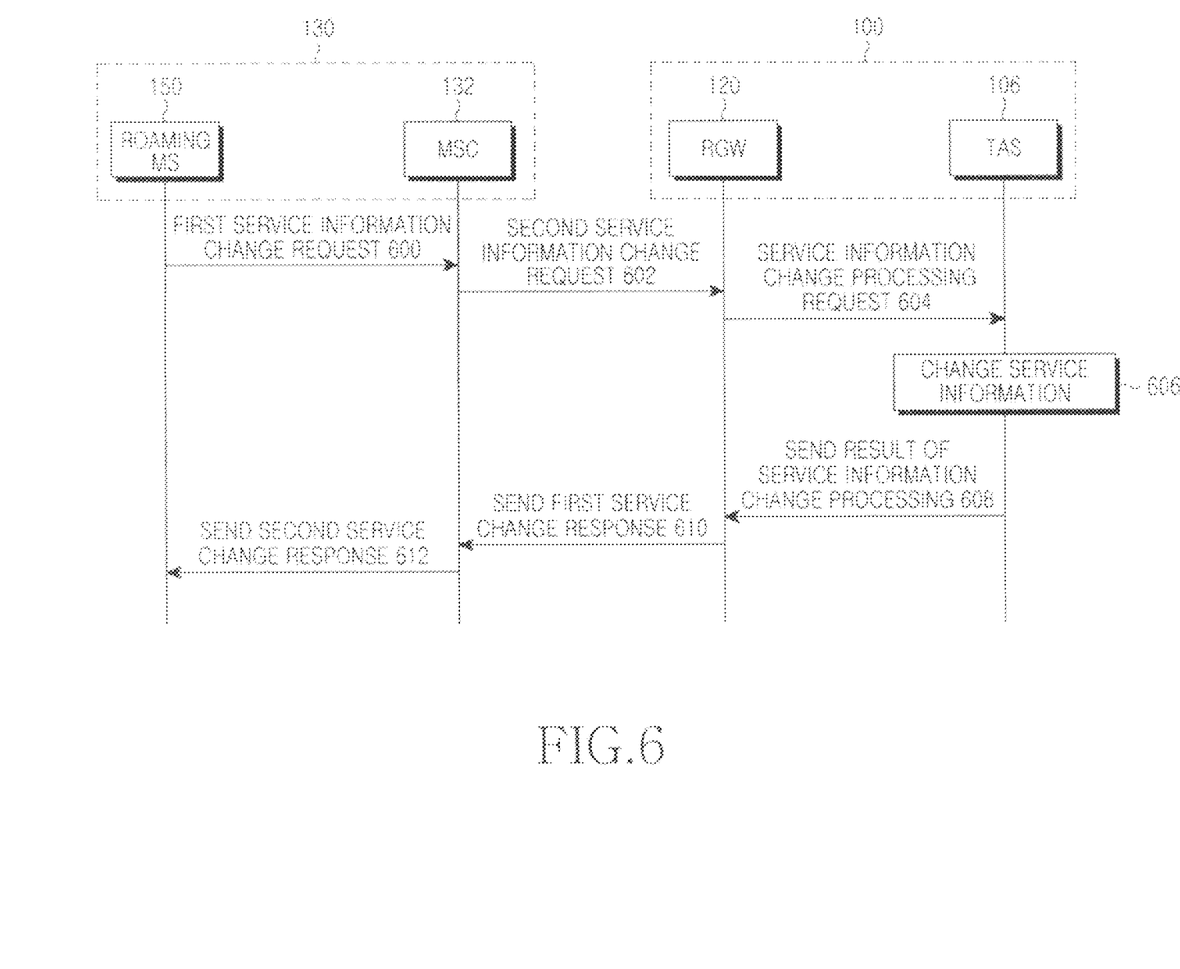
FIG. 6 illustrates a procedure in which an MS controls service information of an IMS network in a CS network after roaming from the IMS network to the CS network in a wireless communication system in accordance with an embodiment of the present invention.

Next, reference will be made to FIG. 6 illustrating a procedure in which an MS (roaming MS) 150 controls service information of the IMS network 100 in the CS network 130 after roaming from the IMS network 100 to the CS network 130 in the wireless communication system according to an embodiment of the present invention.

Referring to FIG. 6, in block 600, the MS (roaming MS) 150 roaming from the IMS network 100 to the CS network 130 sends a first service information change request message for services, serviced by the IMS network 100, to the MSC 132 of the CS network 130.

The first service information change request may include request information for activation, deactivation, deletion, and modification of the services. The request information may include, for example, request information for changing incoming call barring service during roaming, which the roaming MS 150 currently uses, to incoming call enable service during roaming. The request information may also include request information for canceling international outgoing call barring service by the roaming MS 150.

Upon receiving the first service information change request message from the roaming MS 150, in block 602, the MSC 132 sends a second service information change request message to the RGW 120 in order to request the IMS network 100 for service information change.

An interface employed in the conventional CS network 130 is used between the MSC 132 and the RGW 120. That is, the MSC 132 uses the conventionally defined interface of the CS network 130 to send the second service information change request message to the RGW 120. For example, when the CS network 130 is a GSM/WCDMA network, the second service information change request message may be sent to the RGW 120 in the form of a MAP_AS (Activation Supplementary Service) message.

The RGW 120 maps service information transmitted/received between the IMS network 100 and the CS network 130, and changes a specific interface in such a manner as to correspond to the corresponding network, thereby enabling communication between the two networks 100, 130. In FIG. 6, the RGW 120 changes service information, which is included in the second service information change request message received from the MSC 132, in such a manner as to correspond to the interface of the IMS network 100.

In general, an SIP protocol is used in the IMS network 100. Accordingly, the RGW 120 changes the interface between the IMS network 100 and the CS network 130 by using a message within the SIP protocol, such as SIP_OPTION or SIP_SUBSCRIBE/NOTIFY. In block 604, the RGW 120 sends a service information change processing request message including the service information to the TAS 106. The service information change processing request message sent from the RGW 120 to the TAS 106 may be represented, for example, as shown below in Table 2.

TABLE 2

OPTIONS sip:7780001@solution.com SIP/2.0
  From: sip:7780001@solution.com;tag=1928301774
  To: sip:7780001@solution.com
  Content-Type: application/rgwServinfo+ xml
  <?xml version="1.0" encoding="UTF-8"?>
  <tas-services xmlns="urn:ss:params:xml:ns:tas-services">
    <tas-service tas-action="activate">
      <cfu>
        <cfu-data tdn="0707001001"/>  ==>  Call Forwarding number change and registration Service activation
      </cfu>
    </tas-service>
  </tas-services>
SIP/2.0 200 OK
  From: sip:7780001@solution.com;tag=1928301774
  To: sip:7780001@solution.com
  Content-Length: 0

In Table 2, by way of example, the service information change processing request message includes information for change and registration of a call forwarding number and information indicating activation of CFU service.

The service information change processing request message including such service information may be sent to the TAS 106 through direct communication, as shown in FIG. 6, but may also be sent to the TAS 106 through indirect communication via the IMS server 102. More specially, when the indirect communication is employed, the service information change processing request message sent from the RGW 120 is first sent to the IMS server 102. The IMS server 102 then delivers the service information change processing request message to the TAS 106 by using the service triggering information TASI.

Upon receiving the service information change processing request message, the TAS 106 detects the service information included in the service information change processing request message. The TAS 106 changes service information corresponding to the detected service information in block 606, and sends the result of the service information change processing to the RGW 120 in block 608. Here, the result of the service information change processing sent from the TAS 106 is first sent to the IMS server 102. The IMS server 102 then delivers the result of the service information change processing to the RGW 120 by using the service triggering information RGWI. Of course, the result of the service information change processing sent from the TAS 106 may be sent directly to the RGW 120, as described above.

In block 610, the RGW 120 then sends a first service information change response message including the result of the service information change processing to the MSC 132. Subsequently, in block 612, the MSC 132 sends a second service information change response message to the roaming MS 150, thereby allowing the roaming MS 150 to confirm the result of the service information change processing.

In this way, the roaming MS 150 can readily and easily change or delete service information, provided from the IMS network 100, through the above procedure, even when roaming to the CS network 130.

Figure 7:
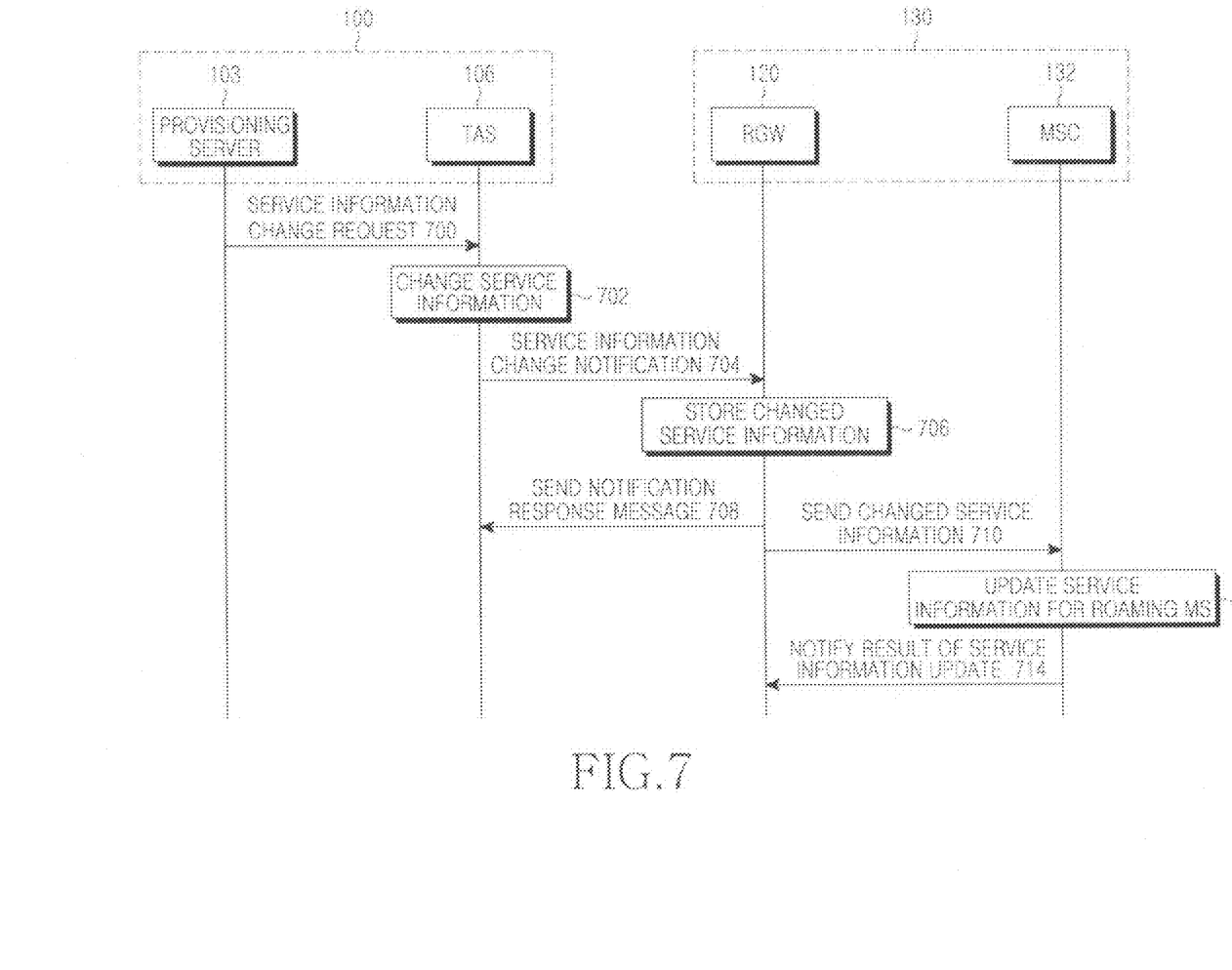
FIG. 7 illustrates a procedure in which service information for an MS, changed in an IMS network, is provided to a CS network when the MS roams from the IMS network to the CS network in a wireless communication system in accordance with an embodiment of the present invention.

Next, reference will be made to FIG. 7 illustrating a procedure in which service information for the MS (roaming MS) 150, changed in the IMS network 100, is provided to the MS 150 in the CS network 130 when the MS 150 roams from the IMS network 100 to the CS network 130 in the wireless communication system according to an embodiment of the present invention.

In FIG. 7, after the MS 150, a subscriber of the IMS network 100, roams to the CS network 130, service information for the roaming MS 150 is changed in the IMS network 100. The service information for the roaming MS 150 may be changed according to the operating policy of the operator of the IMS network 100, or may also be changed by a specific application server, such as a provisioning server, or any other MS logged in the IMS network 100. In FIG. 7, let us suppose that the service information for the roaming MS 150 is changed by the provisioning server 103.

Referring to FIG. 7, in block 700, the provisioning server 103 sends a service information change request message to the TAS 106 in order to change service information for services to be provided to the MS 150 that has roamed to the CS network 130.

The service information change request message may include request information for activation, deactivation, deletion, and modification of the services. The request information may include, for example, request information for changing incoming call barring service during roaming, which the roaming MS 150 currently uses, to incoming call enable service during roaming. The request information may also include request information for canceling international outgoing call barring service by the roaming MS 150.

Upon receiving the service information change request message, in block 702, the TAS 106 changes the service information for the roaming MS 150. In block 704, the TAS 106 sends a service information change notification message to the RGW 120 in order to notify the RGW 120 of the changed service information. Here, the service information change notification message sent from the TAS 106 may be sent directly to the RGW 120, but may also be sent from the IMS server 102 to the RGW 120 by using the service triggering information RGWI.

As mentioned above, an SIP protocol is used in the IMS network 100, and thus the TAS 106 sends the service information change notification message to the RGW 120 by using a message within the SIP protocol. The service information change notification message sent from the TAS 106 may be defined, for example, in the form of XML within an SIP message, as shown below in Table 3.

TABLE 3

```
OPTIONS sip:7780001@solution.com SIP/2.0
  From: sip:7780001@solution.com;tag=1928301774
  To: sip:7780001@solution.com
  Content-Type: application/rgwServinfo+ xml
    <?xml version="1.0" encoding="UTF-8"?>
    <tas-services xmlns="urn:ss:params:xml:ns:tas-services">
      <tas-service tas-action="deactivate">   ==>   Change to Call
        <cfu/>                                      Forwarding
      </tas-service>                                deactivation state
    </tas-services>
SIP/2.0 200 OK
  From: sip:7780001@solution.com;tag=1928301774
  To: sip:7780001@solution.com
  Content-Length: 0
```

In Table 3, by way of example, the service information change notification message includes information indicating deactivation of CFU service.

Upon receiving the service information change notification message, the RGW 120 detects service information to be changed, which is included in the service information change notification message. The RGW 120 stores the service information changed according to the detected service information in block 706, and then sends a notification response message to the TAS 106 in response to the service information change notification message. Here, the notification response message sent from the RGW 120 may be sent directly to the TAS 106, but may also be sent from the IMS server 120 to the TAS 106 by using the service triggering information TASI.

Next, in block 710, the RGW sends the changed service information to the MSC 132.

In order to enable communication between the IMS network 100 and the CS network 130, the RGW 120 changes a specific interface in such a manner as to correspond to the corresponding network, as mentioned above. For example, when the CS network 130 is a GSM/WCDMA network, the RGW 120 sends the changed service information to the MSC 132 by using a MAP_DSD (Insert Subscriber Data) or MAP_DSD (Delete Subscriber Data) message.

The MSC 132 updates the service information for the roaming MS 150 in block 712, and sends the result of the update processing to the RGW 120 in block 714.

Accordingly, the roaming MS 150 can continue to be provided with services according to changed service information, even when located in the CS network 130.

According to the present invention as described above, when an MS roams from an IMS network to a CS network, the MS can also be provided with services, serviced by the IMS network, in the CS network, and control the services in the CS network. Therefore, the MS can freely make convenient use of various services of the home network (IMS network) in the roaming network (CS network). Further, communication operators can provide competent and differentiated services to MSs by extending the roaming service therebetween.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for providing roaming service in a wireless communication system, the method comprising:
    receiving an authentication request for a roaming mobile station (MS), which roams from an Internet protocol multimedia subsystem (IMS) network to a circuit switched (CS) network, from a mobile service center (MSC) of the CS network by a roaming gateway (RGW) performing communication between the IMS network and the CS network;
    acquiring authentication information for the roaming MS and service information for supplementary services with which the roaming MS has been provided from the IMS network, in response to the authentication request;
    checking if the roaming MS is entitled to use the supplementary services according to the service information, using the authentication information and the service information;
    if the roaming MS is entitled to use the supplementary services, sending an authentication success message to the MSC; and
    sending the service information to the MSC so as for the roaming MS to be provided with the supplementary services according to the service information in the CS network.

2. The method as claimed in claim 1, wherein acquiring the authentication information and the service information for the roaming MS comprises:
    requesting a home subscriber server (HSS) of the IMS network, which manages profile information of the roaming MS, for the authentication information for the roaming MS, and then receiving the authentication information for the roaming MS from the HSS; and
    requesting a telephony application server (TAS), which provides the supplementary services, for the service information for the roaming MS, and then receiving the service information for the roaming MS from the TAS.

3. The method as claimed in claim 2, further comprising sending a roaming complete message, which indicates that the roaming MS completes roaming to the CS network, to the HSS by the RGW after sending the service information to the MSC.

4. The method as claimed in claim 1, wherein the service information includes information on activation and deactivation states of the supplementary services with which the roaming MS has been provided from the IMS network.

5. The method as claimed in claim 1, further comprising:
    if an MS in the IMS network originates a roaming incoming call destined to the roaming MS, receiving the processing request for the roaming incoming call from an IMS server that performs call and service processing for subscribers of the IMS network;
    requesting the MSC for a roaming number of the roaming MS; and
    upon receiving the roaming number from the MSC, sending the received roaming number to the IMS server.

6. The method as claimed in claim 1, further comprising:
    if an MS in the IMS network sends a roaming message, which is a message destined to the roaming MS, receiving a request of information for processing of the roaming message from an IMS server that performs call and service processing for subscribers of the IMS network; and
    sending the information for processing of the roaming message to the IMS server.

7. The method as claimed in claim 6, further comprising:
    receiving a message for requesting the address of the MSC from a messaging gateway (MSG), which enables message transmission and reception between the IMS network and the CS network; and
    sending the address of the MSC to the MSG.

8. The method as claimed in claim 1, further comprising:
    upon sending a first service information change request message for a change of the service information for the supplementary services, with which the roaming MS has been provided from the IMS network, to the MSC by the roaming MS, receiving from the MSC a second service information change request message for requesting the IMS network for the change of the service information for the supplementary services, with which the roaming MS has been provided from the IMS network;

sending a service information change processing request message to a telephony application server (TAS), which provides the supplementary services; and upon receiving a result of the service information change processing for the roaming MS from the TAS, sending a first service change response message including the result of the service information change processing to the MSC.

9. The method as claimed in claim 1, further comprising:

receiving a service information change notification message, which informs that the service information for the roaming MS is changed, from a telephony application server (TAS) that provides the supplementary services, according to a service information change request for the roaming MS, generated by a specific application server or any other MS in the IMS network;

storing the changed service information according to the service information change notification message;

sending a response message to the TAS in response to the service information change notification message;

sending the changed service information to the MSC; and receiving the service information for the roaming MS updated according to the changed service information from the MSC.

10. A apparatus for providing roaming service between an Internet protocol multimedia subsystem (IMS) network and a circuit switched (CS) network in a wireless communication system, the system comprising:

receiver configured to receive an authentication request for a roaming mobile station (MS), which roams from an Internet protocol multimedia subsystem (IMS) network to a circuit switched (CS) network, from a mobile service center (MSC) of the CS network;

a controller configured to acquire authentication information for the roaming MS and service information for supplementary services with which the roaming MS has been provided from the IMS network, in response to the authentication request, and check if the roaming MS is entitled to use the supplementary services according to the service information, using the authentication information and the service information; and a transmitter configured to, if the roaming MS is entitled to use the supplementary services, send an authentication success message to the MSC, and send the service information to the MSC so as for the roaming MS to be provided with the supplementary services according to the service information in the CS network.

11. The apparatus as claimed in claim 10, wherein the controller requests a home subscriber server (HSS) of the IMS network, which manages profile information of the roaming MS, for the authentication information for the roaming MS, and then controls the receiver to receive the authentication information for the roaming MS from the HSS, and requests a telephony application server (TAS), which provides the supplementary services, for the service information for the roaming MS, and then controls to the receive for receiving the service information for the roaming MS from the TAS.

12. The apparatus as claimed in claim 11, wherein the transmitter sends a roaming complete message, which indicates that the roaming MS completes roaming to the CS network, to the HSS after sending the service information to the MSC.

13. The apparatus as claimed in claim 11, wherein the controller stores the changed service information according to the service information change notification message, controls the transmitter to send a response message to the TAS in response to the service information change notification message, sends the changed service information to the MSC, and controls the receiver to receive the service information for the roaming MS updated according to the changed service information from the MSC.

14. The apparatus as claimed in claim 10, wherein the service information includes information on activation and deactivation states of the supplementary services with which the roaming MS has been provided from the IMS network.

15. The apparatus as claimed in claim 10, wherein, if an MS in the IMS network originates a roaming incoming call destined to the roaming MS, the controller controls the receiver to receive the processing request for the roaming incoming call from an IMS server that performs call and service processing for subscribers of the IMS network, requests the MSC for a roaming number of the roaming MS, and upon receiving the roaming number from the MSC, controls the transmitter to send the received roaming number to the IMS server.

16. The apparatus as claimed in claim 10, wherein if an MS in the IMS network sends a roaming message, which is a message destined to the roaming MS, the controller controls the receiver to receive the request of information for processing of the roaming message from an IMS server that performs call and service processing for subscribers of the IMS network, and controls the transmitter to send the information for processing of the roaming message to the IMS server.

17. The apparatus as claimed in claim 16, wherein the controller controls the receiver to receive a message for requesting the address of the MSC from a messaging gateway (MSG), which enables message transmission and reception between the IMS network and the CS network, and controls the transmitter to send the address of the MSC to the MSG.

18. The apparatus as claimed in claim 10, wherein upon sending a first service information change request message for a change of the service information for the supplementary services, with which the roaming MS has been provided from the IMS network, to the MSC by the roaming MS, the controller controls the receiver to receive from the MSC a second service information change request message for requesting the IMS network for the change of the service information for the supplementary services, with which the roaming MS has been provided from the IMS network, controls the transmitter to send a service information change processing request message to a telephony application server (TAS), which provides the supplementary services, and upon receiving a result of the service information change processing for the roaming MS from the TAS, controls the transmitter to send a first service change response message including the result of the service information change processing to the MSC.

19. A system for providing roaming service in a wireless communication system, the system comprising:

a roaming mobile station (MS) configured to roam from an Internet protocol multimedia subsystem (IMS) network to a circuit switched (CS) network;

a mobile service center (MSC) configured to manage and control the CS network;

a home subscriber server (HSS) configured to manage and store profile information of the roaming MS, the HSS belonging to the IMS network; and a roaming gateway (RGW) configured to:
acquire authentication information for the roaming MS and service information for supplementary services with which the roaming MS has been provided from the IMS network, in response to the authentication request;
check if the roaming MS is entitled to use the supplementary services according to the service information, using the authentication information and the service information;
if the roaming MS is entitled to use the supplementary services, send an authentication success message to the MSC; and
send the service information to the MSC so as for the roaming MS to be provided with the supplementary services according to the service information in the CS network.

20. The system as claimed in claim 19, wherein the RGW requests the HSS for the authentication information for the roaming MS to then receive the authentication information for the roaming MS from the HSS, and requests a telephony application server (TAS) for the service information for the roaming MS to then receive the service information for the roaming MS from the TAS.

\* \* \* \* \*